United States Patent
Core

(10) Patent No.: US 9,428,405 B2
(45) Date of Patent: Aug. 30, 2016

(54) VALVE

(71) Applicant: PARKER HANNIFIN MANUFACTURING (UK) LTD, Hertfordshire (GB)

(72) Inventor: Phillip R. Core, Ilkey (GB)

(73) Assignee: Parker Hannifin Manufacturing (UK) LTD., Hemel Hempstead (GB)

( * ) Notice: Subject to any disclaimer, the term of this patent is extended or adjusted under 35 U.S.C. 154(b) by 339 days.

(21) Appl. No.: 13/859,793

(22) Filed: Apr. 10, 2013

(65) Prior Publication Data

US 2013/0284675 A1 Oct. 31, 2013

Related U.S. Application Data

(63) Continuation of application No. PCT/GB2011/052408, filed on Dec. 6, 2011.

(30) Foreign Application Priority Data

Dec. 7, 2010 (GB) .................................. 1020654.8

(51) Int. Cl.
*F16K 17/14* (2006.01)
*C02F 1/28* (2006.01)
(Continued)

(52) U.S. Cl.
CPC ............. *C02F 1/28* (2013.01); *B01D 17/0202* (2013.01); *B01D 36/008* (2013.01);
(Continued)

(58) Field of Classification Search
CPC ...... F02M 37/22; F02M 37/00; B01D 36/00; B01D 17/02; B01D 17/0202; B01D 27/10; B01D 35/143; B01D 27/103; B01D 35/147; B01D 2201/16; B01D 2201/167; F16K 31/00; F16K 31/001; C02F 1/28; Y10T 137/794; Y10T 137/8085; Y10T 137/2082; Y10T 137/2076; Y10T 137/7736; Y10T 137/3006; Y10T 137/1624

USPC ...... 137/67, 172, 806, 807, 467.5; 210/96.1, 210/418, 97, 110, 248
See application file for complete search history.

(56) References Cited

U.S. PATENT DOCUMENTS 2,104,519 A * 1/1938 Hurn ............................. 210/171
2,578,938 A * 12/1951 Kunin et al. .................. 210/686
(Continued)

FOREIGN PATENT DOCUMENTS

DE  10 2007 039 661 A1  3/2008
DE  10 2008 038 159 A1  2/2010
(Continued)

OTHER PUBLICATIONS

Search Report under Section 17(5), dated Apr. 4, 2011, from the UK Intellectual Property Office in corresponding Great Britain Application No. 1020654.8.
(Continued)

*Primary Examiner* — Craig J Price
(74) *Attorney, Agent, or Firm* — Christopher H. Hunter

(57) ABSTRACT

A valve (16) comprising a housing (30), a valve filter media (34) and an actuator (48). The housing (30) defines a chamber (32) having an inlet (44) and outlet (48). The media (34) is positioned within the chamber (30) such that liquids flowing between the inlet (44) and outlet (48) pass through the media (34). The valve filter media (34) is formed of a material which can absorb hydrocarbons, causing the media (34) to change its material properties thereby restricting the flow of liquids through the valve (16) and increasing the pressure differential across the media (34). The actuator (48) has at least a portion positioned within the housing chamber (32). If the pressure differential across the media (34) exceeds a predetermined threshold, the media (34) bears against the actuator (48) causing the actuator (48) to restrict the flow of liquids through the valve (16).

13 Claims, 9 Drawing Sheets

(51) Int. Cl.
    *B01D 17/02* (2006.01)
    *B01D 36/00* (2006.01)
    *F02M 37/22* (2006.01)
    *F16K 31/00* (2006.01)

(52) U.S. Cl.
    CPC ......... *F02M 37/221* (2013.01); *F16K 31/001* (2013.01); *Y10T 137/1624* (2015.04); *Y10T 137/2076* (2015.04); *Y10T 137/3006* (2015.04); *Y10T 137/7736* (2015.04)

(56) References Cited

U.S. PATENT DOCUMENTS

| | | | |
|---|---|---|---|
| 2,675,359 A * | 4/1954 | Schneider | 521/32 |
| 3,038,610 A * | 6/1962 | Hetherington | 210/96.1 |
| 3,750,688 A * | 8/1973 | Hall et al. | 137/2 |
| 4,091,830 A | 5/1978 | Hirs | |
| 4,145,285 A | 3/1979 | Martin et al. | |
| 4,485,011 A * | 11/1984 | Cole et al. | 210/96.1 |
| 4,588,500 A | 5/1986 | Sprenger et al. | |
| 5,273,066 A * | 12/1993 | Graham et al. | 137/78.3 |
| 5,382,270 A | 1/1995 | Graham et al. | |
| 6,428,687 B1 * | 8/2002 | Moretto | 210/100 |
| 7,297,267 B2 | 11/2007 | Denton et al. | |
| 7,690,391 B2 * | 4/2010 | Guest et al. | 137/67 |
| 2002/0027096 A1 | 3/2002 | Smith et al. | |
| 2002/0104796 A1 | 8/2002 | Maxwell et al. | |

FOREIGN PATENT DOCUMENTS

| | | |
|---|---|---|
| DE | 10 2009 057 478 A1 | 7/2010 |
| GB | 2 112 295 A | 7/1983 |
| JP | 61 234909 A | 10/1986 |
| WO | 2010 146393 A2 | 12/2010 |

OTHER PUBLICATIONS

International Search Report and Written Opinion, dated Mar. 14, 2012, in corresponding International Application No. PCTGB2011/052408.

* cited by examiner

VALVE

CROSS REFERENCE TO RELATED APPLICATIONS

The within application is a continuation of International Application No. PCT/GB2011/052408, filed Dec. 6, 2011, and which designated the United States, and which claims priority to Great Britain Application No. 1020654.8, filed Dec. 7, 2010, the disclosures of which are expressly incorporated herein by reference.

BACKGROUND OF THE INVENTION

The present invention relates to a valve. In particular, the present invention relates to a valve arrange to prevent the discharge of water from a water filter when the discharged water would otherwise be contaminated above a predetermined proportion of hydrocarbons. Particular embodiments of the present invention relate to a water filter valve arranged to restrict the flow of hydrocarbon based fuels, such as diesel and biodiesel. Embodiments of the present invention may form part of a water filter for removing hydrocarbons and other contaminants from water separated from fuel in a fuel filter within a liquid fuel supply system.

Fuel supply systems, and in particular vehicle fuel systems generally comprise at least one fuel filter to remove water and other contaminants from the fuel. For medium and heavy duty trucks, there may be multiple fuel filters, to progressively filter water, large particulate contaminants and fine particles from the fuel supply. It is generally necessary to continuously or periodically remove the separated water from the fuel filter in order to prevent water passing through the filter element into the fuel system and reaching the engine injector nozzles. Filtering may be performed either on the pressure side (that is, downstream of the low pressure fuel pump) or on the suction side (upstream of the low pressure fuel pump). The low pressure fuel pump is positioned upstream of the main fuel pump.

The collected water may be drained manually, semi-automatically or fully automatically, The water may either be collected in a separate receptacle or allowed to drain away. For manual and semi-automatic water drains a water sensor within a fuel filter is arranged to detect when the volume of water exceeds a predetermined level. The operator is then alerted, for instance by illuminating a warning light in the vehicle cabin. Semi-automatic an fully automatic fuel drain valves operate using a solenoid valve, which may be remotely operated by the vehicle operator in response to a warning signal in the vehicle cabin or triggered automatically. Solenoid fuel drain valves are electrically operated. The solenoid cycle (that is, the opening and closing of the solenoid valve), and hence the amount of released water, is controlled by an Engine Control Unit (ECU).

Regardless of the type of water drain, fuel may be inadvertently released along with the water, which unless collected and disposed of correctly is a source of pollution. Furthermore, even if pure fuel is not released, the collected water can contain large amounts, for instance 100-1400 ppm or more, of dispersed hydrocarbons, which are environmentally hazardous substances. In order to comply with European Directive 2000/60/EC relating to water pollution, the amount of hydrocarbons in discharged water must be limited. The term "hydrocarbons" is intended herein to include all petroleum based hydrocarbons in a range of C7 to C40 hydrocarbon chains. Limits for hydrocarbon content are set by each individual European country. The hydrocarbon content limits can be dictated by vehicle or engine manufacturers to their fuel system suppliers. The limits for hydrocarbons in discharged water can be as low as 2 ppm. Measurement of the volume of hydrocarbons in discharged water may be performed according to ISO 9377-2. If the amount of hydrocarbons in the collected water exceeds the set limit then the contaminated water must be collected and disposed of under controlled conditions. If the vehicle is not equipped with a storage tank for the drained water, when water within the filter collection bowl builds up beyond a predetermined level and requires draining the vehicle operator is supposed to stop in a depot and collect the drained water into a suitable vessel to allow the water to be disposed of in a controlled manner. However, typically the vehicle operator simply stops the vehicle where convenient and drains the contaminated water onto the road. The drained water is a source of pollution and is illegal. Furthermore, if pure diesel is spilt onto the road then this could cause accidents due to vehicles slipping on the spilt diesel.

It is known to provide filters to reduce the concentration of hydrocarbons in discharged water. For instance, a water filter may contain a material arranged to absorb hydrocarbons such as activated carbon or activated charcoal. The extremely large surface area (up to 1500 $m^2 \cdot g^{-1}$) of activated charcoal allows for efficient filtration. Toxins such as hydrocarbons build up on the surface of the charcoal due to Van-der-Waals forces. The skilled person will be aware of other suitable materials for absorbing or adsorbing hydrocarbons.

A potential problem associated with water filters for removing hydrocarbons from water is that they may be positioned within the engine bay and due to their inaccessibility it can be difficult to monitor when a filter or filter cartridge requires replacement. Furthermore, the proportion of water in a fuel supply cannot be accurately predicted and so it is necessary to provide a larger water filter than may be strictly required in order to ensure that the filter continues to function until the vehicle is next serviced.

U.S. Pat. No. 7,297,267-B2, which is assigned to Parker-Hannifin Corporation, discloses an oil-sorbing filter element for removing oil from water, for instance from bilge water from a boat. The filter element is generally cylindrical and comprises a permeable outer wall and a permeable tubular core. Between the outer wall and the core there is a filter media or optionally first and second layers of the same or differing filter media surrounding the core. In use the filter element is positioned within a filter housing such that water passes into the housing surrounding the outer wall and permeates through the outer wall into the filter element. The water then passes through the filter media and permeates through the core to exit the filter element via the tubular core. The flow path may also be reversed. The construction of the outer wall, core and filter media is intended to address problems associated with known water filters, which use fibrous or loose fill adsorbent mediums. Specifically, the filter element is intended to address the problems of filter media settling or channelling caused by the flow of the treatment stream. Settling and channelling can shorten the service life of the filter as the water being treated bypasses portions of the filter media that are not yet exhausted.

The filter media disclosed in U.S. Pat. No. 7,297,267-B2 preferably comprises an oleophilic polymeric material. The material is broadly defined as an oil-absorbing thermoplastic elastomer. The terms "oleophilic" and "oil-adsorbing" are defined as meaning that the material has an affinity to hydrocarbons or sorbs hydrocarbons and other sorbable materials, for instance diesel. More particularly, the material may be a styrenic mid-block (A-B-A) copolymer, with the mid-block being a saturated elastomer, for instance styrene-ethylene/butylene-styrene (SEBS) or styrene-ethylene/propylene-styrene (SEPS) or an unsaturated elastomer for instance styrene-butadiene-styrene (SBS) or styrene-isoprene-styrene (SIS). A particularly preferred material is a linear mid-block SEBS copolymer (30 wt % styrene) which is marketed under the name Kraton® G1652 by Kraton Polymers, Houston, Tex., US. A range of alternative materials is also disclosed.

PCT Patent Application PCT/GB2010/050996, which is assigned to Parker Hannifin (UK) Limited, discloses a range of water filters for use in combination with fuel filter water separators. The water filters include a filter indicator arranged to restrict the flow of water through the water filter when the water filter is approaching exhaustion.

SUMMARY OF THE INVENTION

It is an object of embodiments of the present invention to obviate one or more of the problems associated with the prior art, whether identified herein or elsewhere. In particular, it is as object of embodiments of the present invention to provide a valve to prevent the discharge of water from a water filter which is contaminated above a predetermined level of hydrocarbons. It is an object of particular embodiments to provide a valve capable of restricting the flow of hydrocarbon based fuels, such as diesel and biodiesel. It is an aim of further embodiments of the present invention to provide a water filter incorporating such a valve in which water separated from a vehicle fuel supply is filtered such that the cleaned water may be disposed of on the ground without polluting the environment. It is a further object of embodiments of the present invention to provide a water filter that provides an indication when the capacity of the filter to filter further hydrocarbons from water has reduced below a threshold.

According to a first aspect of the present invention there is provided a valve comprising: a housing defining a chamber having an inlet and an outlet; a valve filter media within the chamber arranged such that liquids flowing between the inlet and the outlet pass through the valve filter media, the valve filter media being arranged to absorb hydrocarbons causing the valve filter media to change its material properties thereby restricting the flow of liquids through the valve and increasing the pressure differential across the valve filter media; and an actuator having at least a first portion positioned within the housing chamber; wherein if the pressure differential across the valve filter media exceeds a predetermined threshold the valve filter media is arranged to bear against the actuator causing the actuator to restrict the flow of liquids through the valve.

An advantage of the present invention is that if water contaminated with hydrocarbons flows through the valve the valve filter media absorbs a proportion of the hydrocarbons, which progressively restricts the flow of contaminated water through the valve. When the valve is incorporated into a water filter comprising a further bulk filter material the reduction of flow of water through the valve can be detected, thereby indicating that the water filter is approaching exhaustion and cannot effectively filter any more water. A water sensor controlled by an ECU may be arranged to detect the reduction in water flow. The water sensor may either be positioned within the water filter itself or within a fuel filter to which the water filter is coupled. In response to a signal from the water sensor indicating that the filter media is exhausted the vehicle Engine Control Unit (ECU) may provide a warning signal to the vehicle operator indicating that the water filter requires replacement. The valve therefore serves to define the end of life of the water filter. Without the valve, once the bulk filter material is exhausted water exiting the water filter could exceed limits set for the allowable proportion of hydrocarbons in discharged water.

A further advantage of the first aspect of the present invention is that the safety valve is arranged to rapidly restrict the flow of hydrocarbon based fuels such as diesel and biodiesel through the actuator closing the valve. For instance, if the safety valve is incorporated into a water filter to clean up water separated from a fuel supply, in the event of failure of flow control valves in the water filter, pure fuel causes the safety valve to close limiting the amount of fuel passing into the water filter.

Said change in the material properties of the valve filter media as it absorbs hydrocarbons may comprise the valve filter media expanding.

At least part of the actuator may be positioned within the chamber between the valve filter media and the outlet such that the expanded valve filter media contacts that portion of the actuator causing the actuator to actuate.

The actuator may extend across the chamber between the valve filter media and the outlet, wherein if the expanded valve filter media bears against the actuator the actuator is arranged to move to close the outlet. In particular, the actuator may comprise a perforated diaphragm such that water flowing through the valve passes through the diaphragm perforations. The outlet may comprise a hole in the housing and the diaphragm may comprise a first uninterrupted portion arranged to contact the housing surrounding the hole when the valve filter media bears against the diaphragm to close the outlet, the diaphragm further comprising a second perforated portion to allow liquids to flow through.

The inlet may comprise an inlet cap forming part of the housing, the inlet cap comprising two or more inlet ports spaced apart across the inlet cap to distribute the flow of liquids into the valve.

The valve filter media may comprise an oleophilic polymeric material.

According to a second aspect of the present invention there is provided a water filter comprising: a closed shell defining a chamber having an inlet and an outlet; a bulk filter material within the chamber arranged such that water flowing from the inlet to the outlet passes through the hulk filter material, the bulk filter material being arranged to filter hydrocarbons from the water; and a valve as described above arranged relative to the shell such that water passing through the shell passes through the valve; wherein a reduction in the capacity of the bulk filter material to filter hydrocarbons from the water is indicated by a reduction in the flow of water through the valve.

The valve may be positioned proximal to the water filter inlet such that water flowing through the water filter passes through the valve before passing through the bulk filter material. The water filter inlet may be positioned at a first end arranged in use to be the upper end such that water flowing through the water filter passes through the valve and through a tube extending through the shell and opening into the chamber proximal to the second end of the shell, the outlet comprising a tube extending from a position where it opens within the chamber proximal to the first end and extending to the exterior of the second end of the shell.

According to a third aspect of the present invention there is provided a fuel filter comprising: a water filter as described above; a sealed chamber having a fuel inlet and a fuel outlet separated by a filter media arranged to allow fuel to pass through and to prevent water from passing through, the fuel filter being arranged such that in use a mixture of fuel and water passes into the chamber through the fuel inlet, filtered fuel passes out of the first chamber through the fuel outlet and water collects in the chamber, the chamber having a water outlet arranged in use to be positioned at the bottom of the chamber; a flow control valve coupled to the water outlet; and a coupling arranged to receive the water filter such that the flow control valve communicates with the water filter inlet.

The fuel filter may further comprise: a water level sensor within the sealed chamber arranged to provide a water-in-fuel signal if the level of water within the sealed chamber exceeds a predetermined level; and a processor arranged to receive the water-in-fuel signal and arranged to control the operation of the flow control valve in response to the water-in-fuel signal to selectively release water from the sealed chamber to the water filter according to a predetermined water release cycle.

The processor may be arranged to provide an output signal indicating that a release cycle has taken place.

According to a fourth aspect of the present invention there is provided a method of limiting the flow of hydrocarbons, the method comprising: providing a valve comprising a housing defining a chamber having an inlet and an outlet, a valve filter media within the chamber arranged such that liquids flowing between the inlet and the outlet pass through the valve filter media, and an actuator having at least a first portion within the housing chamber; and supplying liquids to the inlet; wherein in response to water contaminated with hydrocarbons flowing through the valve, the valve filter media absorbs hydrocarbons from the water causing the valve filter media to change its material properties thereby restricting the flow of water through the valve and increasing the pressure differential across the valve filter media; wherein if the pressure differential across the valve filter media exceeds a predetermined threshold the valve filter media is arranged to bear against the actuator causing the actuator to restrict the flow of liquids through the valve.

The closure mechanism may comprise an actuator, wherein if the pressure differential across the valve filter media exceeds a predetermined threshold the valve filter media contacts the actuator causing the actuator to actuate to close the valve.

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

Figure 1:
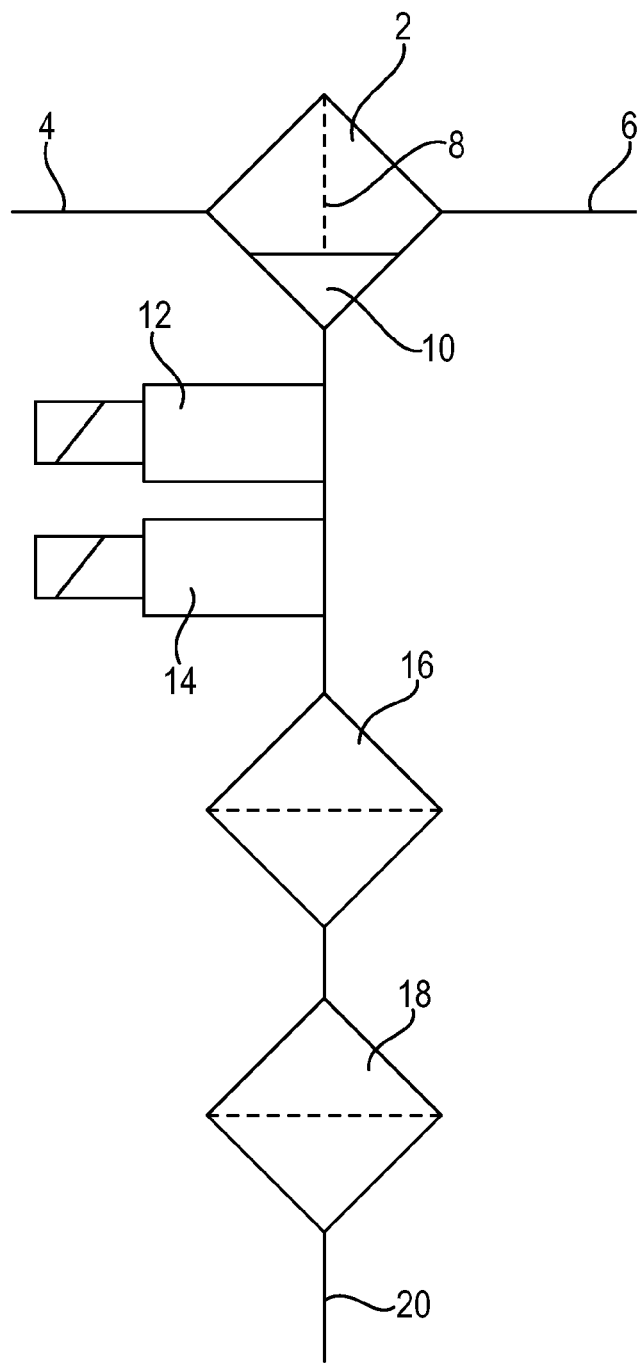
FIG. 1 is a flow diagram schematically illustrating a water filter in accordance with an embodiment of the invention.

The present invention relates to a valve comprising a material arranged to absorb hydrocarbons from water passing through the valve. In particular embodiments the valve is incorporated into, or otherwise connected to, a water filter comprising a further bulk filter material to absorb hydrocarbons from water passing through the filter. The valve has two functions. Firstly, for water contaminated with a relatively small proportion of hydrocarbons, the filter material within the valve progressively restricts the flow of water as hydrocarbons are absorbed. The rate of restriction is chosen such that when the valve is used in conjunction with a water filter with a further bulk filter material the flow of water through the valve reduces to below a minimum threshold before the bulk filter material is exhausted. That is, the flow of water through the valve reduces to below the minimum threshold (which may be separately detected) before the proportion of hydrocarbons within the water exiting the bulk filter material rises above a maximum contamination threshold. The valve may be considered to indicate that the water filter is approaching the end of its operational life as the restriction of the flow of water through the valve can be readily monitored directly or indirectly. The second function of the valve is to rapidly block the flow of all liquids in the event that substantially pure hydrocarbon fuel, for instance diesel, is supplied to the valve. The valve may be termed a safety valve owing to this second function as this provides a backup in the event of failure of one or more flow control valves. The second function of the valve occurs as the valve filter media rapidly absorbs hydrocarbons from the material causing its material properties to change, for instance by expanding. This causes the valve filter media to contact an actuator closing the valve if the pressure differential across the valve filter media (due to inlet liquid pressure) exceeds a predetermined maximum. It will be appreciated that the first and second functions represent extreme examples of a range of responses according to the proportion of hydrocarbons present in liquids flowing through the valve. As the valve filter media absorbs hydrocarbons the pressure differential across the valve filter media will increase as the flow of liquid is restricted, which may cause an actuator to actuate to rapidly close the valve if the pressure differential exceeds a threshold, or the flow of liquids may be progressively reduced.

Valves in accordance with embodiments of the present invention form part of an automatic and fail safe clean water drain system arranged to automatically clean and discharge water filtered from a vehicle fuel supply by a fuel filter water separator (FFWS). In particular, in certain embodiments the clean water drain system is arranged to automatically clean water contaminated with hydrocarbons, with a proportion of hydrocarbons ranging approximately from 50 ppm (parts per million) to 250 ppm. The drain system may be required to reduce the proportion of hydrocarbons in the water to less than 2 ppm dispersed and dissolved according to ISO 9377-2 (measurement) before the water is discharged, for instance onto the road surface. As noted above, valves in accordance with embodiments of the present invention serve to automatically prevent the discharge of water contaminated to above 2 ppm hydrocarbons by restricting the flow of water to a bulk filter material within the water filter before the bulk filter material is exhausted. Consequently, the valve defines and indicates the end of operational life of the water filter. The water filters are arranged to have an operational life which is equivalent to the service life of the fuel filter and applicable to the vehicle operating environment. Factors affecting the operational life of the water filter include the expected proportion of water within fuel supplies (and hence the volume of water the filter is required to process) and level of hydrocarbon contamination in separated water.

Referring to FIG. 1, this is a flow diagram schematically illustrating the arrangement of a fuel filter water separator 2 and a water filter in accordance with an embodiment of the present invention. The fuel filter water separator 2 comprises a fuel inlet 4 and a fuel outlet 6. Fuel passing between the inlet 4 and outlet 6 passes through a filter membrane 8 which separates water from the fuel. Separated water collects at the fuel filter base 10. The volume of separated water can be monitored using water sensors within the fuel filter base (as will be described below) and when the volume of water exceeds a first threshold water can be drained from the fuel filter base by opening first and second solenoid valves 12, 14. Two solenoid valves 12, 14 are provided in series and both must be opened to allow water to flow from the fuel filter base 10. Two solenoid valves 12, 14 are provided so as to prevent the uncontrolled flow of fuel from the fuel filter water separator 2 in the event of the failure of a single solenoid valve.

The contaminated water passes through the solenoid valves 12, 14 to a valve 16 in accordance with embodiments of the present invention and described in greater detail below in connection with FIG. 2. The valve 16 incorporates an absorption media, for instance a polymer absorption media, which progressively restricts the flow of water by absorbing a proportion of the hydrocarbons present within the water. Water which passes through the valve 16 then passes through a bulk filter material 18, which may for instance be an activated carbon filter. In combination the valve absorption media and the bulk filter material 18 absorb hydrocarbons from the water to reduce the proportion of hydrocarbons from upwards of 50 ppm in the fuel filter base 10 to less than 2 ppm at the water outlet 20. In combination, the valve 16 and the hulk filter material 18 form a water filter suitable for coupling to a fuel filter water separator 2.

Water filters in accordance with embodiments of the present invention preferably operate on the pressure side of a fuel pump. The pressure within the fuel filter base 10 may typically be 6 bar, though exceptionally the pressure may reach 30 bar or higher. The water discharged at water outlet 20 is at 0 bar. The majority of the pressure drop occurs across the solenoid valves 12, 14, for instance 5.7 bar at a water flow rate of 600 l/min with further pressure drops of 0.2 bar at 600 l/min across the valve 16 and 0.1 bar at 600 l/min across the bulk filter material 18.

A first purpose of valve 16 is to prevent the discharge of contaminated water above 2 ppm from outlet 20 by restricting the flow of water through the water filter before the bulk filter material 18 is exhausted. The restriction of flow of water can be separately detected and provides an indication that the water filter has reached the end of its operational life and must be replaced. The flow capacity of the bulk filter material 18 may not reduce as its ability to adequately filter water reduces, and so the bulk filter material 18 may not be able to determine its end of life condition without the presence of the valve 16.

A second purpose of the valve 16 is to rapidly cut off the flow of liquids in the event that pure fuel, or water highly contaminated with hydrocarbons, enters the valve (for instance, due to simultaneous failure of solenoid valves 12, 14). Before the valve 16 closes completely a small volume of fuel (for instance less than 5 ml) will pass through, though this can be readily filtered by the bulk filter material such that the threshold proportion of hydrocarbons in the discharged water is not exceeded. It will be appreciated that in alternative embodiments the valve 16 may be positioned downstream of the bulk filter material 18, or portions of the bulk filter material may be provided upstream and downstream of the valve 16. However, most preferably the valve 16 is upstream of the bulk filter material 18 so that the small volume of fuel which passes through before the valve 16 closes may be absorbed by the bulk filter material 18. Most preferably, in certain embodiments of the present invention the valve 16 closes substantially instantaneously in the event of pure fuel flowing into the valve 16.

Figure 2:
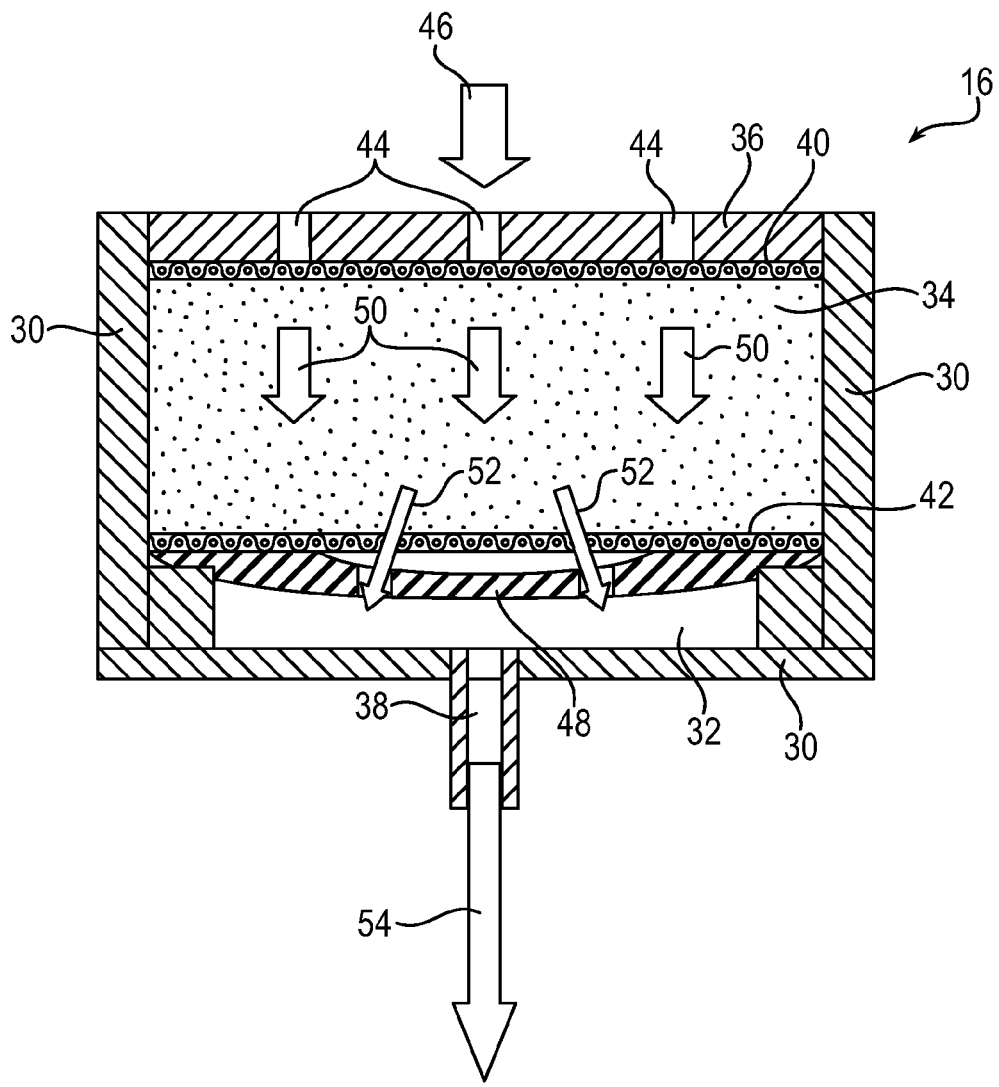
FIG. 2 is a cross sectional view of a valve in accordance with a first embodiment of the present invention in an open configuration.

FIG. 2 shows the valve 16 in an open configuration. The valve 16 comprises a housing 30 defining an internal chamber 32. A valve media 34 extends across the whole width of the chamber 32 between an inlet cap 36 and an outlet drain 38. The valve media 34 may comprise a granular material (before exposure to hydrocarbons) and so is retained in position by inlet and outlet meshes 40, 42. In other embodiments the meshes may not be required. The meshes 40, 42 serve only to support the valve media 34 and do not substantially affect the flow of liquids through the valve 16. It will be appreciated that the shape, depth (thickness) and cross section structure of the meshes may be varied. In particular, these parameters may be arranged so as to aid the flow distribution of liquids passing through the valve, both at the inlet and at the outlet. Inlet cap 36 comprises a plurality of inlet ports 44 distributed across the width of the valve 16 to ensure that water and fuel flowing into the valve 16 (indicated by arrow 46) is distributed fully across the valve media 34 so that the valve media 34 absorbs hydrocarbons evenly. Valve 16 further comprises a perforated diaphragm 48 extending across the chamber 32. Water passing through valve 16 flows through valve media 34 as indicated by arrows 50 and then through the diaphragm 48 (arrows 52) before leaving the valve 16 through drain 38 (arrow 54).

The valve media 34 comprises an oleophilic polymeric material arranged to absorb hydrocarbons. One class of suitable materials may be broadly defined as oil-absorbing thermoplastic elastomers, and particular examples are listed in the introductory portion of the present specification. Suitable materials are disclosed in U.S. Pat. No. 7,297,267-B2 and listed in the introductory portion of the present specification. The following materials may be suitable, and further materials will be readily identifiable by the appropriately skilled person: NR (Nitrile rubber), SBR (Styrene-butadiene), SBS (styrene and butadiene), SEBS (styrene-ethylene/butylene-styrene), SEPS (styrene-ethylene/propylene-styrene), IR (isoprene Rubber), Natural Rubber, Natural Rubber Latex and Polyisoprene Latex. Sorbflow V has been demonstrated to form a thick, viscous liquid when hydrocarbons are absorbed. Kraton® G1652 may be suitable as 10 g of Kraton® G1652 absorbs around 70 g of hydrocarbons to form a jelly like or rubbery material, which can be substantially impervious to water. It will be apparent to the appropriately skilled person that the appropriate material is dependent upon the required form of the reduction of water flow as the bulk filter material becomes exhausted.

In order to reduce or block the flow of material through the valve 16, the valve media 34 is chosen such that as hydrocarbons are absorbed the physical properties of the plug change. For instance, it may be desirable for the plug to expand, become more viscous, or partially or fully solidified. The valve media 34 may be chosen to provide a gradual reduction in the flow of water as hydrocarbons are absorbed and the media becomes more homogenous. The shape of the valve media 34 and the cavity 32 may also affect the type of response to absorbed hydrocarbons.

Figure 3:
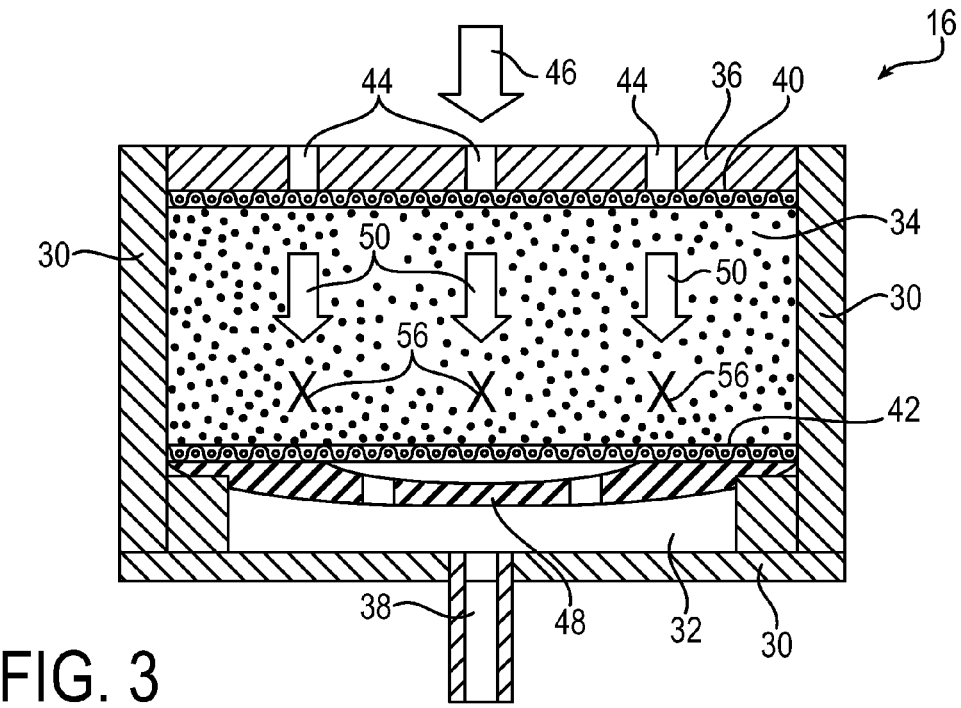
FIG. 3 is a cross sectional view of the valve of FIG. 2 in a first closed configuration.

With reference to FIG. 3, as water contaminated with hydrocarbons flows through valve 16 the valve media 34 absorbs hydrocarbons from the water. The valve media 34 substantially reduces or fully blocks the flow of water through the valve after a predetermined volume of water, at a predetermined concentration of hydrocarbons, has passed through valve 16. The reduction in water flow may be detected, as will be described below, which indicates that the water filter requires replacement. The reduction in water flow also causes an increase in the pressure difference across the valve 16. The reduction in flow occurs as the valve media 34 changes state upon exposure to hydrocarbons and transforms to a homogenous state creating a flow restriction as indicated by marks 56. The meshes 40, 42 hold the valve media 34 in position and thereby prevent water from flowing around the valve media 34.

While valve media 34 does perform filtering of the water, in that it absorbs hydrocarbons from water passing through, this is not its main function. Rather, the valve media 34 is arranged to absorb a predetermined proportion of the hydrocarbons present in the water as it passes into the filter to reduce or fully block the flow of water through the valve 16 when the bulk filter material 18 is exhausted and consequently the capacity of the water filter to filter hydrocarbons from the water to below a predetermined threshold has been degraded. In practice, a safety margin is built into the design of the valve media 34 such that the flow of water through the valve 16 is reduced before the bulk filter material 18 is fully exhausted. The material from which valve media 34 is formed may be chosen to ensure that hydrocarbons are trapped, while allowing small particles, for instance salts, to pass through unfiltered.

Figure 4:
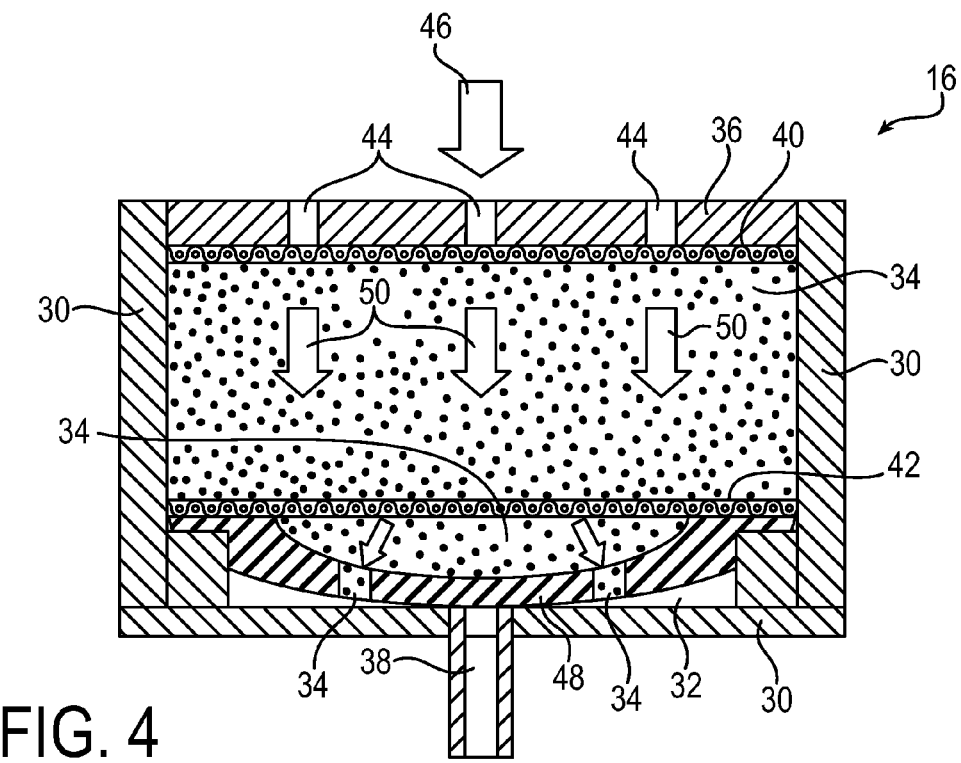
FIG. 4 is a cross sectional view of the valve of FIG. 2 in a second closed configuration.

In the event of fuel entering the valve 16, the valve media 34 may not be able to sufficiently quickly respond by forming a homogenous state. In practice the valve media 34 forms a highly viscous rubber state, which can extrude or flow through the outlet mesh 42 as illustrated in FIG. 4 if the pressure differential across the valve filter media exceeds a predetermined threshold. As the extruded valve media 34 presses against the diaphragm 48 the diaphragm 48 is pressed against the housing 30 and closes the valve outlet 38. Typically less than 5 ml for instance 1 to 3 ml, of fuel will pass through the valve 16 before the diaphragm moves to close off the valve outlet 38. This small amount of fuel may be readily absorbed by the bulk filter material 18. In certain, embodiments substantially no fuel passes through the valve before the diaphragm 48 closes the valve outlet. The fuel causes portions of the valve media proximal to the inlet to form a viscous mass before fuel has passed fully through the valve media 34. Inlet fluid pressure presses against the viscous portion of the valve media, which transfers force through the remainder of the valve media 34 to the diaphragm. The valve media 34, when exposed to pure fuel in this way, in combination with the diaphragm 48 is capable of withstanding 6 bar to 30 bar without leakage. It will be appreciated that closure of the outlet due to operation of the diaphragm may also occur in the case of a reduction in flow as the media progressively absorbs hydrocarbons from contaminated water if that reduction causes the pressure differential to rise above the threshold. That is, the diaphragm is not solely triggered by pure fuel entering the valve, but rather is dependent upon the changing pressure differential.

It will be appreciated that in alternative embodiments of the present invention the diaphragm may be replaced by an alternative form of actuator. Force is transferred through the partially or fully rubberised, viscous valve media on sudden contact to fuel so that the valve media bears against the actuator (if necessary extruding the valve media through the mesh) and causes at least part of the actuator to move. The actuator moves to closes of the fluid flow either upstream or downstream of the valve media.

In certain embodiments of the invention the risk of fluids finding preferential flow paths through the valve media, which reduces the exposure of the fluids to the valve media, can be minimised by adjustment of the valve inlet. For instance valve inlet ports 44 may be reconfigured as fingers which extend downwards into the valve filter media so that the fluid is discharged into the middle of the valve filter media. This reduces the risk of fluid passing around the outside of the valve filter media.

Figure 5:
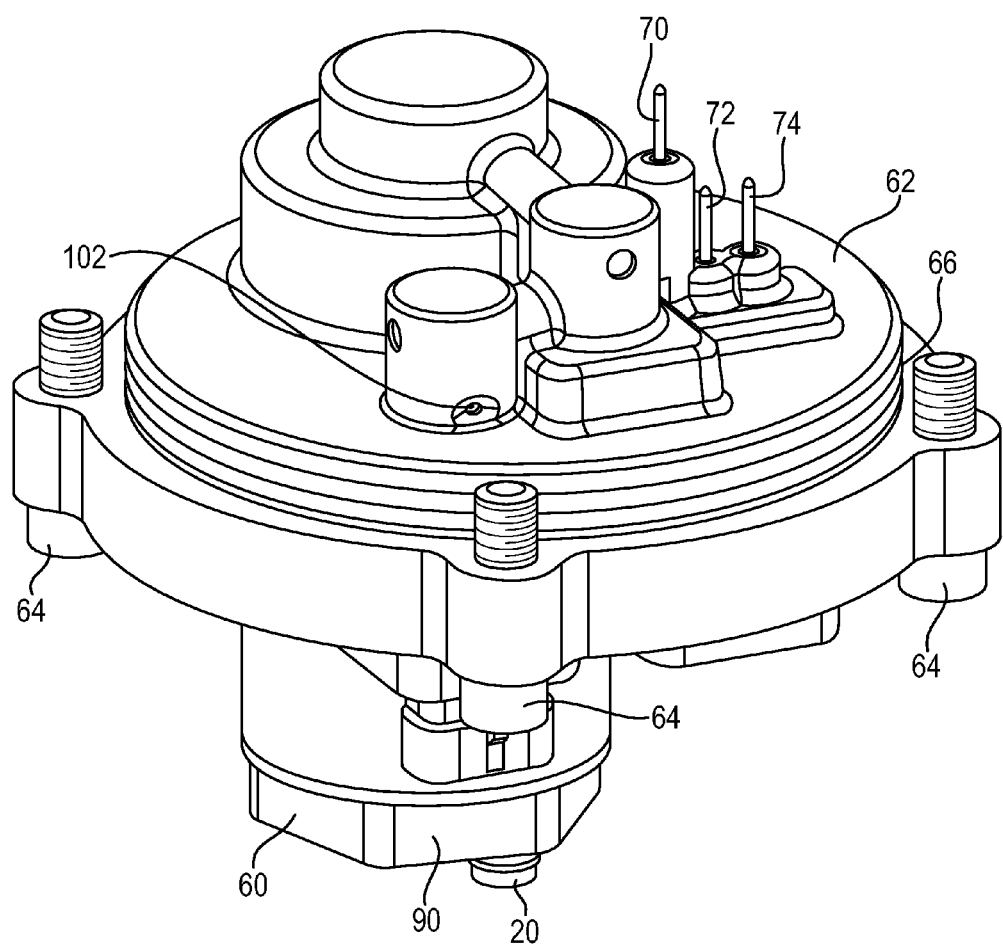
FIG. 5 is a perspective view of a fuel filter base incorporating a water filter in accordance with an embodiment of the present invention.

Referring now to FIG. 5, this illustrates a perspective view of a water filter 60 (only the bottom edge is visible) and a fuel filter base 62 in accordance with an embodiment of the present invention. The filter bowl 62 is arranged to be coupled to a filter housing forming the remainder of a filter body (not illustrated) by screws 64 and sealed to the housing to form a closed filter body by an O-ring 66. The water filter 60 is received within cavity 68 (visible in FIGS. 7 and 8) within the filter bowl 62 which in use is underneath the filter body, and secured in position by a screw thread coupling 69 (visible in FIGS. 7 and 8). FIG. 5 also illustrates water in fuel (WIF) sensors 70, 72, 74 which extend upwards from the fuel filter base 62 and are used to determine when to release water from the filter bowl 62 into the water filter 60, as will be described below.

Figure 6:
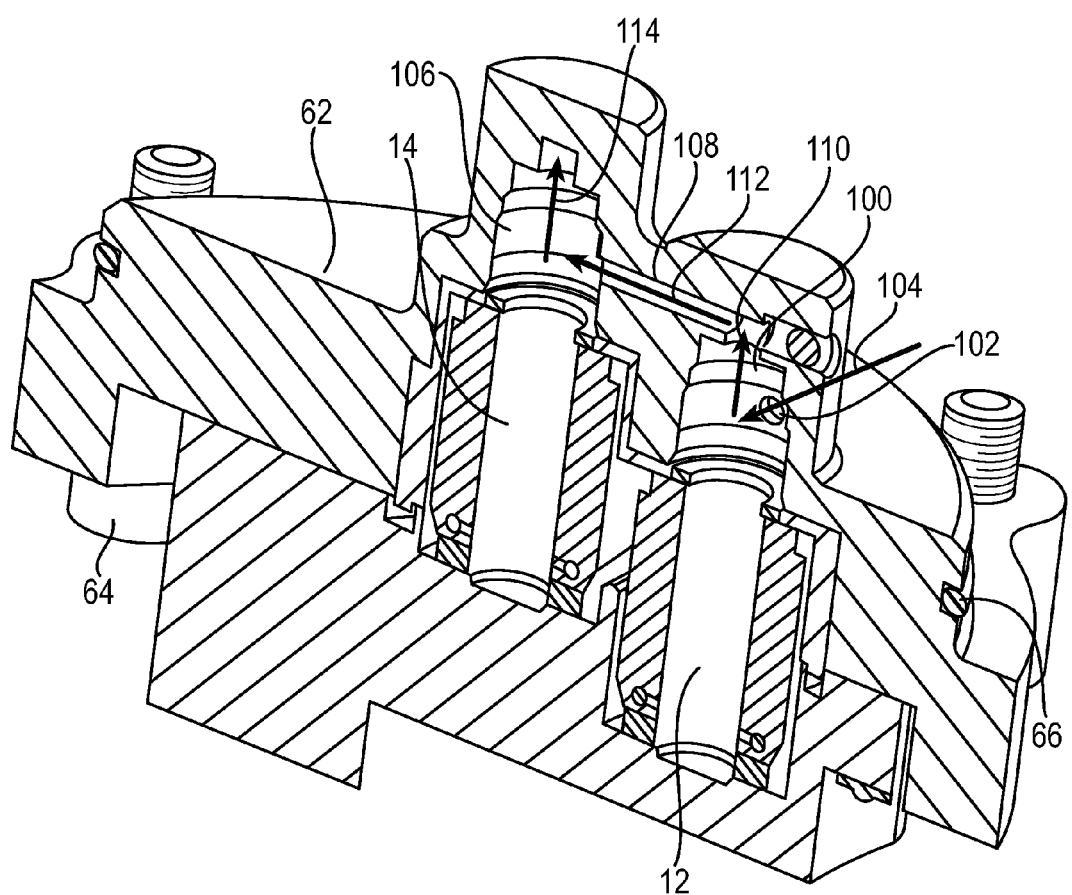
FIG. 6 is a cross sectional view of the fuel filter base of FIG. 5 illustrating the arrangement of a pair of solenoid valves.
Figure 7:
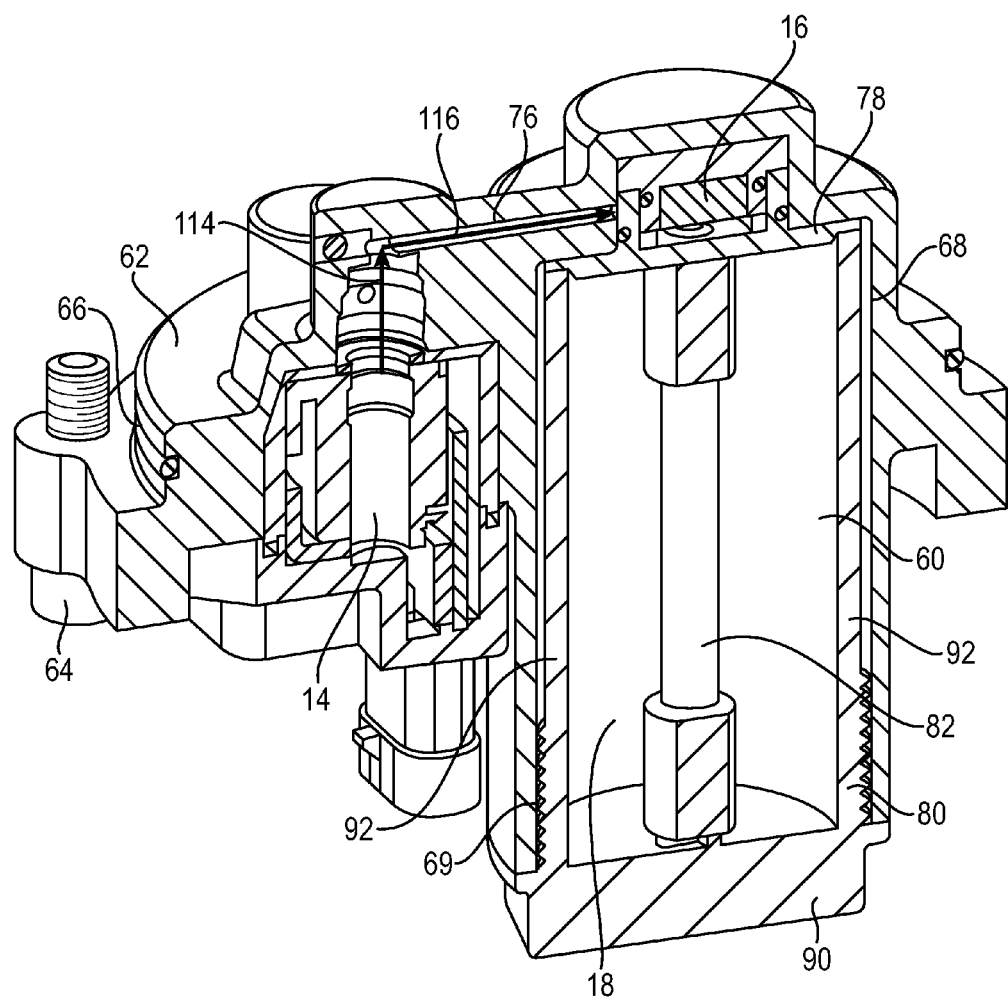
FIG. 7 is a cross sectional view of the fuel filter base and water filter of FIG. 5 illustrating the flow of water from the solenoid valves to the water filter.

Referring also to FIG. 6, this illustrates a cross sectional view of the filter bowl 62 showing the relative arrangement of the solenoid valves 12, 14. Solenoid valves 12, 14 can be opened to allow water to pass through an inlet (not visible in FIG. 6), through each valve in turn and then on to the water filter 60. Water separated from the fuel supply enters chamber 100 of solenoid valve 12 through inlet 102 as indicated by arrow 104. Solenoid valve 12 controls the flow of water from chamber 100 to chamber 106 of solenoid valve 14 through passage 108 as indicated by arrows 110, 112. Solenoid valve 14 controls the flow of water from chamber 106 to the water filter 60 as indicated by arrow 114. FIG. 7 illustrates the water filter 60 being coupled to the second solenoid valve 14 via passage 76 as indicated by arrows 114, 116.

Figure 8:
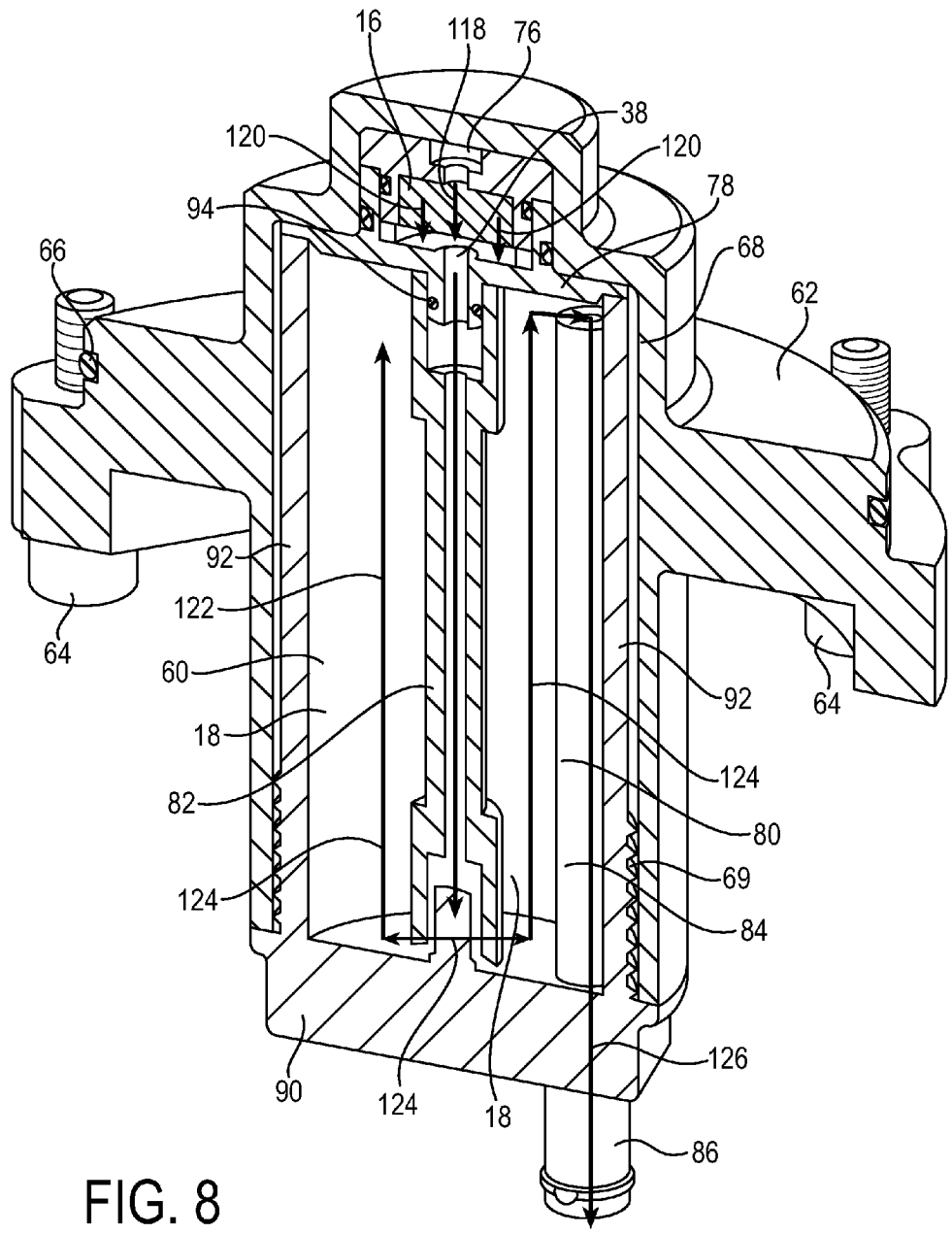
FIG. 8 is a cross sectional view of the fuel filter base and water filter of FIG. 5 illustrating the flow of water through the water filter.

FIG. 8 illustrates in cross section the flow of water through the water filter 60. Water enters the water filter 60 via the safety valve 16 positioned in a top cap 78. Specifically, the water enters from passage 76 and passes into the valve 16 through valve top cap 36 as indicated by arrow 118. Water flows through valve 16 as indicated by arrows 120 to valve outlet 38. The water filter 60 comprises a housing 80 containing the bulk filter material 18. Water from the safety valve 16 passes downwards through a central tube 82 as indicated by arrow 122 and then flows upwards through the bulk filter material 18 as indicated by arrows 124 towards the top of the housing, where it flows downwards through a second tube 84 to an outlet 86 as indicated by arrow 126.

The water filter 60 of FIGS. 5 to 8 is arranged to be coupled to a fuel filter positioned on the pressure side of a vehicle fuel supply system (that is, downstream of low pressure fuel pump generating up to approximately 6 bar). The pressurised fuel serves to drive water upwards through the water filter 60, and specifically through the bulk filter material 18 as described above. Cleaned water is driven out through outlet 86. Outlet 86 may be coupled to a storage tank (not illustrated) or via a hose to a position within the engine bay where the cleaned water may be discharged onto the road.

The WIF sensors 70, 72, 74 are arranged to provide a water level signal to an Engine Control Unit (ECU) when the water collected within the filter body exceeds a predetermined level. The ECU is arranged to control the solenoid valves 12, 14 to open for a predetermined period of time to release water under the pressure of the fuel via the outlet from the filter bowl 62, through the solenoid valves 12, 14 and into chamber 68 via passage 76. When a water filter 60 is present within chamber 68 the passage 76 communicates with the safety valve 16 to allow the water to pass into the water filter 60. The length of time for which the solenoid valves 12, 14 are opened is chosen to ensure that the water within the fuel filter base 62 does not fall below a minimum level, thereby ensuring that pure fuel does not enter the water filter 60. The length of time for which the solenoid valves are open may be proportional to the volume of water in the fuel filter base 62, the pressure within the filter and the desired volume of water to be injected into the water filter 60.

Water passing through the water filter 60 is gradually cleaned as it passes upwards through the hulk filter material 18 within the water filter 60 before passing back down through tube 84 to the outlet 86. As the filter 60 is filled from the bottom, this reduces the chance of water preferentially passing through only part of the bulk filter material 18. Consequently, the bulk filter material 18 absorbs hydrocarbons evenly across the width of the water filter 60 and progressively from the bottom of the filter towards the top. The water is gradually cleaned as it flows upwards and the filter media is gradually exhausted from the bottom upwards.

The water is pushed upwards through the water filter 60 by the injection of further water when the solenoid valves 12, 14 are next opened. The volume of the water filter 60, and the amount of water released by each actuation of the solenoid valves 12, 14, are chosen to ensure that water remains within the water filter 60 for a minimum period of time to ensure sufficient cleaning before leaving the filter. For instance, the solenoid valves 12, 14 may be timed to release 10 ml of water each time they are opened (for approximately 1 s at an operating pressure of 10 bar). The minimum interval between solenoid activation may be 4 minutes which provides a maximum water drain rate of 150 ml per hour. If the capacity of the water filter is 60 ml this ensures a minimum residence time within the water filter of 24 minutes. This flow rate may be compared with expected conditions: if a diesel engine consumes 45 l of fuel per 100 km, the vehicle is travelling at 100 km/h and the proportion of water in the fuel is 0.1% this gives a maximum water filter cleaning requirement of 45 ml per hour, which is well within the capacity of the water filter. Under extreme conditions for towing a heavy load up a gradient the fuel consumption may rise to 300 l per 100 km at 50 km/h. The cleaning requirement for the water filter rises to 150 ml per hour, which is still within the capacity of the water filter.

As illustrated best in FIG. 8, the water filter 60 is formed from a housing 80 comprising a base 90, side walls 92 and top cap 78. The housing 80 may be formed from a plastics material, a metallic material or any other suitable material suitable for forming fuel and water filters. The base 90 and the side walls 92 may be integrally formed. The cap 78 including the safety valve 16 is secured to side walls 92 such that safety valve outlet 38 engages centre tube 82 and is sealed to centre tube 82 by an O-ring 94. The base 90 is formed with a hexagonal grip as shown in FIG. 5 allowing a user to rotate the water filter 60 as it is inserted into chamber 68.

The bulk filter material 18 fills the chamber defined by the housing 80 and can be a loose media or a solid media. Any suitable media material which can filter hydrocarbons (and possibly other contaminants) from water may be used. Examples include activated carbon or charcoal, Sorbflow V (available from Parker Hannifin Corporation of the US) and Wavestream, Ecolok and Solviro (all available from Wave International Limited of the UK). U.S. Pat. No. 7,297,267-B2, which is discussed above in the introductory portion of the present specification, provides details of a range of other suitable filtering mediums including oil-absorbing thermoplastic elastomers. Other suitable materials will be readily apparent to the skilled person.

When the safety valve 16 blocks the further flow of water, or the flow of water is significantly restricted, operation of the solenoid valves 12, 14 does not result in a reduction in the level of water within the fuel filter, or the reduction in water level is not as great as normal dining the predetermined opening time of the solenoid valves 12, 14. This may be monitored by the ECU by detecting if the WIF sensors continue to indicate that the water level remains above a predetermined level even after the solenoid valves 12, 14 have been operated. The vehicle operator may then be alerted, for instance by illuminating a warning light in the vehicle cabin, so that a replacement water filter may be fitted. Alternatively, the warning light may not be illuminated until the ECU detects that the water level has failed to reduce sufficiently after a number of operations of the valve, for instance three times.

Referring back to FIG. 5, within the fuel filter base 62 there are provided two water-in-fuel (WIF) sensors comprising three sensor electrodes 70, 72, 74 arranged to provide water level signals to a processing unit such as a processor (not illustrated) within the fuel filter base 62. The WIF sensors operate by passing electricity through the liquid within the fuel filter base 312 between pairs of electrodes. Effectively WIF sensor electrode 72 serves as a common ground shared between the two WIF sensors, as will be explained below. This eliminates the need to have a fourth electrode. The processor is arranged to receive data from the WIF sensor electrodes 70, 72, 74, to control the opening and closing of the solenoid valves 12, 14 and to provide data to an Engine Control Unit (ECU, not illustrated). The ECU is typically a general purpose ECU that is also responsible for controlling other aspects of the engine operation in addition to the water filter.

A first WIF sensor comprises electrodes 70 and 72. Electrode 70 is raised up relative to the other electrodes 72, 74, which are at the same level. The first WIF sensor is arranged to indicate whether the amount of water in the filter bowl is above or below a first, high water threshold. That is, when the water level is above electrode 70 this is detectable by a change in the current passing between electrodes 70, 72

(or alternatively a change in the voltage between the electrodes) indicating that they are separated only by water rather than fuel or a mixture of fuel and water. A second WIF sensor comprises electrodes 72, 74 and is arranged to indicate whether the amount of water in the filter bowl is above or below a second, low water threshold. When the water level falls below the level of either electrode 72, 74 then this is detectable by a change in the current passing between electrodes 72, 74 (or alternatively a change in the voltage between the electrodes). When the water level is between the electrodes 72, 74 and electrode 70 the first WIF sensor indicates that the water level is below the high water threshold and the second WIF sensor indicates that the water level is above the low water threshold. The high water threshold may be 250 ml and the low water threshold may be 100 ml. Collectively, the two WIF sensors provide signals to processor indicating whether the water level is above the high water threshold, between the high and low water thresholds, or below the low water threshold. The WIF sensors are able to determine that fuel is present between the respective probe tips if the resistance between the probes exceeds 47 kΩ. If the resistance between the probes is less than 10 kΩ then this indicates that water is present at the probe tips.

The processor is arranged to control solenoid valves 12, 14 to release water from the filter bowl when the first WIF sensor indicates that the amount of water in the bowl is above the high water threshold. Specifically, the processor is arranged to trigger a controlled release of a predetermined amount of water through the solenoid valves 12, 14 into the water filter 60 in response to detecting that the amount of water exceeds the high water level. The amount of water released is dependent upon the amount of time that the valves are opened and the pressure within the fuel filter. The pressure may either be directly measured or it may be estimated.

After a controlled release of water from the filter bowl, if the water level remains above the high water level the processor is arranged to trigger further controlled releases of water according to a predetermined cycle. For instance, the processor may be arranged to release 10 ml of water from the filter bowl once every 4 minutes until the amount of water reduces below the high water threshold. The amount of water released and the time between releases of water is chosen to ensure that water remains within the water filter 60 for a sufficient length of time to ensure adequate filtering. For instance, the amount of water released may equate to half the volume of the water filter 60. Additionally, the amount of water released is chosen to ensure that the water level does not fall below the low water threshold, to minimise the risk of pure fuel flowing to the water filter 60. Once the water level in the filter bowl reduces below the high water threshold, the processor stops further releases of water. If the water level falls below the low water threshold, as detected by the second WIF sensor then this is indicative of a fault in the system causing uncontrolled release of water, and then fuel. The processor is arranged to send a signal to the ECU, which may in turn supply a visual or audible warning to the vehicle operator.

The ECU can be arranged to count the number of cycles of releases of water in response to signals from the processor each time a release cycle takes place. A predetermined maximum number of cycles is chosen corresponding to the maximum amount of water at expected levels of hydrocarbons that can be safely filtered by the water filter 60 before the bulk filter material 18 becomes exhausted. The amount of water that can be safely filtered, and hence the volume and type of bulk filter material 18 used in the water filter 60, is chosen according to the amount of water that is expected to be filtered from a vehicle fuel supply during a vehicle service interval. That is, the number of cycles that ECU is arranged to allow, and that the water filter 60 can safely process, should be greater than the expected maximum number of cycles encountered during a vehicle service interval. Alternatively, the water filter 60 may be intended to last for the life of the vehicle, assuming low concentrations of water in fuel supplies and low level of pollutants in the water. If the predetermined maximum number of cycles is reached during a service interval then the ECU may be arranged to warn the vehicle operator that the water filter 60 requires replacement sooner than the next planned vehicle service. It will be appreciated that alternatively, the processor on board the fuel filter base 62 may be arranged to count the number of cycles and send a signal to the ECU when the predetermined maximum number is reached. However, in practice it may be simpler for the ECU to maintain this count. It will be appreciated that the ECU may be arranged to count the number of released cycles, or to count downwards from the predetermined maximum number of cycles. Additionally, in certain embodiments there may be two or more warning signals to the vehicle operator, a first indicating that the maximum number of cycles has almost been reached and a second which indicates that the maximum has been reached and the water filter may no longer be adequately filtering water. After the maximum number of cycles has been reached the processor will continue to initiate release cycles in response to signals from the WIF sensors as it will continue to be necessary to dispose of water separated from the fuel supply to prevent damage to the engine.

As discussed above, the safety valve provides an additional safety feature to the water filter 60 preventing the release of unacceptable levels of hydrocarbons. The bulk filter material 18 may become exhausted at a faster rate than anticipated when the number of cycles of water release is chosen, for instance by the water being more contaminated than expected. The safety valve 16 is arranged to reduce or block the flow of water into the water filter 60 before the bulk filtering medium 18 is completely exhausted, that is before the concentration of pollutants in water exiting the water filter exceeds the predetermined level. The effect is to reduce or completely stop the reduction of the water level in the filter bowl during a release cycle. During a release cycle the solenoid valves 12, 14 are opened but the level of water does not go down at all or at least not as much as expected as the flow is partially or fully cut off by the valve 16. Consequently the processor triggers further release cycles if the water level stays above the high water level. The maximum number of cycles will be quickly reached, and this may be detected by the ECU (or the processor) which maintains the count of cycles. As noted above, a warning signal may be provided to the vehicle operator. Effectively, the ECU indirectly monitors the state of the safety valve 16 by monitoring the variation in water level in the filter bowl during planned releases of water.

The safety valve 16 may also block the flow of liquids in the event of the release of pure fuel from the fuel filter, for instance if both solenoid valves 12, 14 fail and are left in an open state simultaneously. Pure fuel may simultaneously react with polymer in the safety valve blocking the flow. This may lead to the level of water in the filter bowl beginning to rise again until it exceeds the high water level. The processor will trigger water release cycles as normal, but because the safety valve 16 is blocked, the water level in the filter bowl will not go down. As described above, further release cycles will be triggered until the maximum number of cycles is reached, and a warning signal is provided to the vehicle operator indicating that the water filter 60 requires changing. During servicing of the water filter 60 the functioning of the solenoid valves 12, 14 may be checked and they may be repaired if necessary.

Water filters in accordance with embodiments of the present invention allow the water to be cleaned such that the amount of hydrocarbons is reduced to less than or equal to 2 ppm. The cleaned water may then be discharged without being a source of pollution and in accordance with EU ground water pollution regulations. Furthermore, the water filters comprise an inbuilt means of indicating when the filter requires replacement which may be monitored, for instance by the ECU, and used to alert a vehicle operator. Consequently, the size and cost of the water filters may be reduced as they need not be based upon an overly conservative estimate of the amount of water to be cleaned between vehicle servicing intervals.

The service life of a water filter in accordance with an embodiment of the present invention is dependent upon the fuel water content and the retained hydrocarbon level for discharged water. For a water filter containing 60 g of activated carbon as the bulk filter material, fuel contaminated with water at 0.02% and separated water contaminated with 50 ppm hydrocarbons this equates to a maximum capacity of the water filter of 80 l of contaminated water, which may provide a service life of up to 1.2 million km. If the proportion of water in the fuel supply increases to 0.1% and the contamination of separated water increases to 100 ppm hydrocarbons then the service life reduces to 120,000 km. The safety valve is required to pass the same volume of hydrocarbons to the water filter before significantly reducing the flow rate regardless of the expected service life of the water filter. In a typical embodiment the safety valve may contain 0.2 g to 0.6 g of polymer filter material and may absorb approximately 10-30% of the total hydrocarbons passing through the water filter. The water filter may further contain approximately 60 g of activated carbon serving as the bulk filter material with an absorption capacity of 6 g of hydrocarbons to provide the final filtering of the water to reduce the hydrocarbon concentration to below 2 ppm. It will be appreciated that in alternative embodiments of the invention the size of the valve may be scaled up or down as appropriate to suit any automotive of industrial application where water is separated from fuel. In particular, the volumes of the valve filter material and the bulk filter material may be modified to meet the particular requirements of each application, including the volume of water to be processed, the expected rate of contamination of the water and the acceptable limit of contamination of water discharged from the water filter.

In addition to mandating limits on the proportion of hydrocarbons in discharged water, European regulations also place restrictions on other contaminants, for instance certain heavy metals such as cadmium and mercury. Although not normally present in diesel, other contaminants such as these may be present if the water, which contaminates the fuel, also contains those contaminants. Certain embodiments of the present invention may also filter such contaminants from water separated from fuel, according to the nature of the filter media used.

Safety valves according to embodiments of the present invention described above include meshes within the housing to secure the valve filter media in position. However, it will be readily apparent to the appropriately skilled person that in certain other embodiments one or both meshes may be omitted. Whether the meshes are needed may depend upon the material properties of the valve filter media and the construction of the remainder of the valve.

The above described safety valves are generally considered to have two separate responses, firstly in the event of water contaminated with a relatively small amount of hydrocarbons passing through the filter and secondly in the event of substantially pure fuel entering the valve. It will be appreciated that in certain embodiments the distinction in how the valve responds may be less clear. In general the valve filter media absorbs hydrocarbons from any liquids passing through the valve, which causes the valve filter media to change its material properties (for instance by expanding) to restrict the flow of liquids. The restriction may occur without the valve filter media moving to contact the diaphragm, particular if the inlet pressure is low.

Furthermore, the above described diaphragm is only one form of actuator which may serve to partially or fully close the valve outlet when contacted by the expanded valve filter media. It will be understood that alternative actuators could include seals and plungers, or any other moving part according to the particular requirements of the shape of the housing and the valve filter media material. More generally, valves in accordance with embodiments of the present invention operate by detecting an increase in the pressure differential across the valve filter media as it absorbs hydrocarbons from liquids flowing through the valve. If the pressure differential exceeds a predetermined maximum the pressure of liquids at the inlet may cause the valve filter media to move or otherwise contact the actuator. The actuator in turn cuts of the flow of liquids through the valve. This may be by the actuator itself moving to seal the valve outlet, or for instance by a portion of the actuator closing the valve inlet, or in any other way.

Valves in accordance with embodiments of the present invention described above include a closure mechanism comprising a mechanical actuator arranged to act if an increase in the differential pressure across the valve filter media rises above a predetermined threshold. The mechanical actuators may be actuated by the valve filter media moving in response to the increased differential pressure to contact the actuator. Alternatively, the mechanical actuator may directly sense either the pressure differential or the inlet pressure to the valve. More generally, valves in accordance with the present invention include any closure mechanism arranged to substantially block the flow of liquids through the valve in accordance with a rise in differential pressure. For instance, in certain embodiments of the present invention a pressure gauge may be provided at the safety valve inlet (that is, upstream of the valve filter material) to directly sense the inlet pressure. The measured pressure may be used to determine whether to close a separate shut of valve positioned upstream or downstream of the safety valve.

Figure 9:
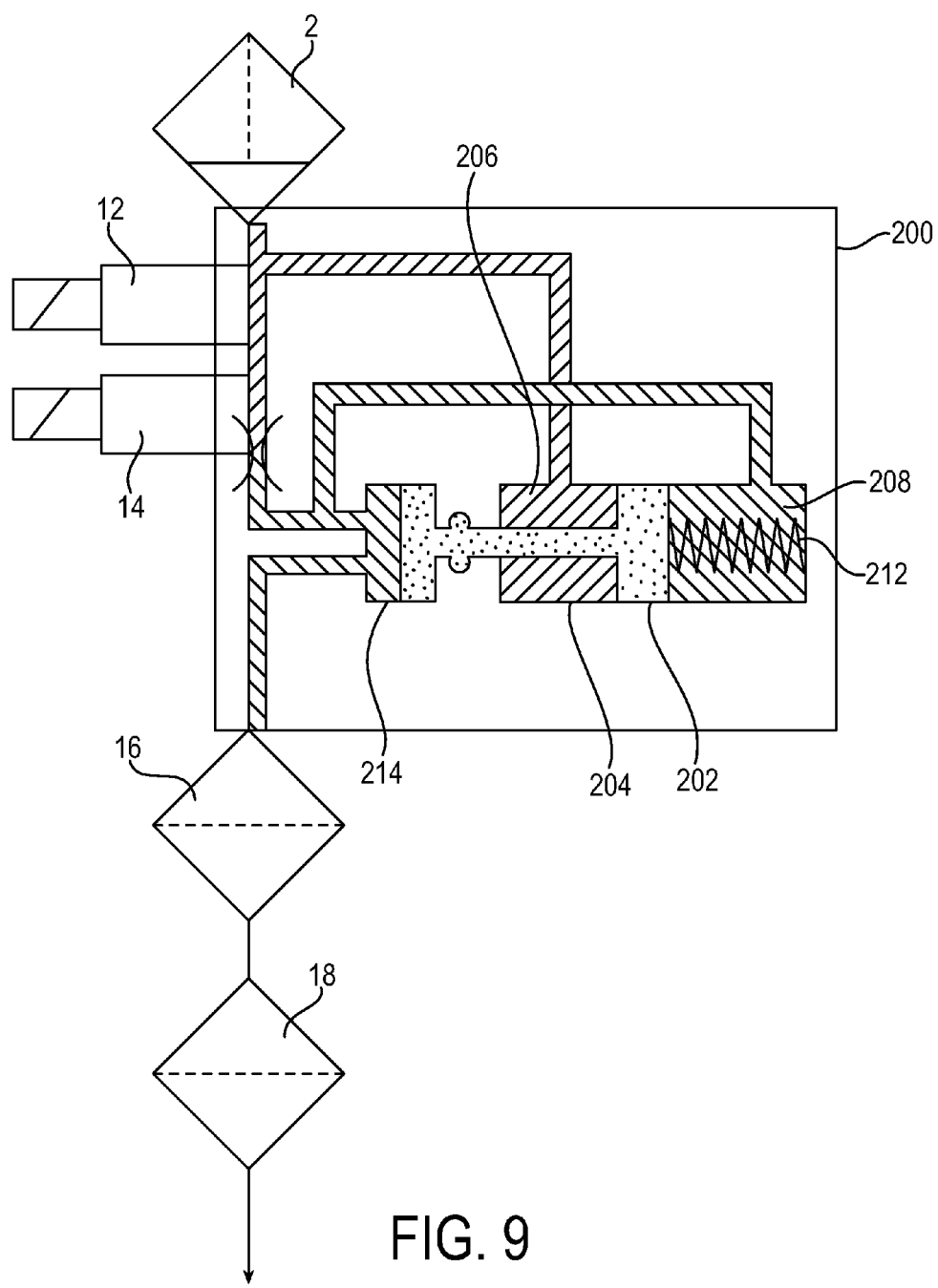
FIGS. 9 and 10 are flow diagrams schematically illustrating an alternative water filter including an alternative valve.
Figure 10:
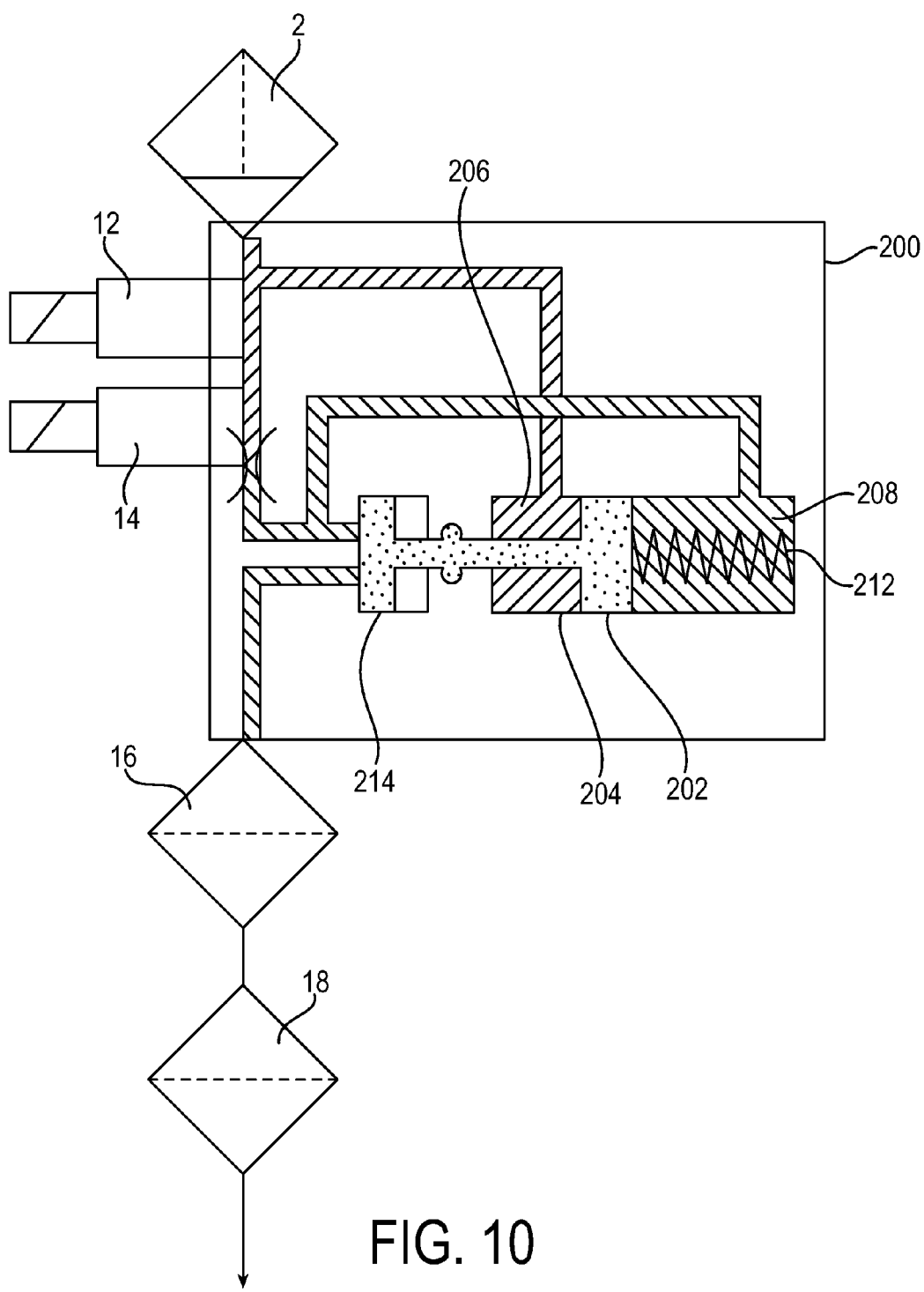

Referring now to FIGS. 9 and 10 these illustrate an alternative water filter including an alternative design of valve. FIG. 9 shows the valve open and FIG. 10 shows the valve closed.

As for the embodiment of FIG. 1, FIGS. 9 and 10 show a fuel filter water separator 2 coupled by solenoid valves 12, 14 to a safety valve 16 and then a bulk separator 18. However, safety valve 16 now further includes a hydraulic closure mechanism 200 comprising a piston 202. Piston 202 slides within piston chamber 204. A first side 206 of the piston chamber is coupled to the liquid supply from the fuel filter water separator 2 such the pressure acting on the piston 202 on the first side is at, for instance, 6 bar. The second side 208 of the piston chamber 204 is coupled to the inlet of the valve 16 (that is, coupled to the inlet of the housing containing the valve filter media). The pressure at the valve housing inlet is at a substantially lower pressure than the pressure after the fuel filter water separator 2 due to the pressure drop across the solenoids 12, 14 (illustrated schematically by the restriction 210). When the valve is open (that is, before the pressure differential across the valve filter media has begun to rise) the pressure in the second side 208 of the piston chamber 204 may, for instance, be at 1 bar. The second side 208 of the piston chamber further comprises a spring 212 with a spring resistance equivalent to an additional 3 bar of fluid pressure. The resultant piston pressure is 2 bar acting to move the piston 202 to the right in FIG. 9, causing inlet valve 214 to be open. FIG. 10 shows the position when the pressure at the inlet of the housing containing the valve filter media has risen to 4 bar due to the valve filter media significantly reducing the flow of water. The resultant piston pressure is now 1 bar acting to move the piston 202 to the left in FIG. 10, causing inlet valve 214 to close. The skilled person will appreciate that the point at which the inlet valve 214 closes can be adjusted, for instance by adjusting the spring resistance and the side of the piston acted upon in each half of the chamber. It will be appreciated that the embodiment of FIGS. 9 and 10 are just one example of a valve closure mechanism arranged to sense pressure build up due to a reduction in flow of liquid through a valve filter media and to block further flow of liquid, in which mechanical contact with the valve filter media is not required.

In a further modification of the present invention a chemical release media or device may be provided within or connected to the safety valve arranged to release a chemical agent to prevent or reduce bacterial growth in the stagnant water (in the water collection bowl and/or the water filter). It is desirable to reduce bacterial growth as this could prematurely block the flow of water through the water filter.

Further modifications to and applications of the present invention will be readily apparent to the appropriately skilled person without departing from the scope of the appended claims.

What is claimed is:

1. A valve, comprising:
 a housing defining a chamber having an inlet and an outlet;
 a valve filter media within the chamber arranged such that liquids flowing between the inlet and the outlet pass through the valve filter media, the valve filter media being arranged to absorb hydrocarbons, causing material properties of the valve filter media to change, thereby restricting the flow of liquids through the valve and increasing the pressure differential across the valve filter media; and
 an actuator having at least a first portion positioned within the housing chamber, between the valve filter media and the outlet, and normally in a first position allowing flow of liquid through the valve;
 wherein if the pressure differential across the valve filter media exceeds a predetermined threshold, the valve filter media and the actuator cooperate to cause the actuator to move to a second position restricting the flow of liquids through the valve.

2. A valve according to claim 1, wherein said valve filter media has expansion properties when exposed to hydrocarbons.

3. A valve according to claim 2, wherein the at least first portion of the actuator is positioned within the chamber between the valve filter media and the outlet such that expansion of the valve filter media causes the valve filter media to bear against a part of the actuator between the media and outlet to move the actuator from the first position allowing the flow of liquids through the valve, to the second position restricting the flow of liquids through the valve.

4. A valve according to claim 1, wherein the inlet comprises an inlet cap forming part of the housing, the inlet cap comprising two or more inlet ports spaced apart across the inlet cap to distribute the flow of liquids into the valve.

5. A valve according to claim 1, wherein the valve filter media comprises an oleophilic polymeric material.

6. A valve according to claim 1, wherein the actuator is normally in a first position allowing the flow of liquids through the valve.

7. A valve, comprising:
 a housing defining a chamber having an inlet and an outlet;
 a valve filter media within the chamber arranged such that liquids flowing between the inlet and the outlet pass through the valve filter media, the valve filter media being arranged to absorb hydrocarbons, causing material properties of the valve filter media to change, thereby restricting the flow of liquids through the valve and increasing the pressure differential across the valve filter media; and
 an actuator having at least a first portion positioned within the housing chamber and normally in a first position allowing flow of liquid through the valve;
 wherein if the pressure differential across the valve filter media exceeds a predetermined threshold, the valve filter media and actuator cooperate to restrict the flow of liquids through the valve, wherein the actuator extends across the chamber between the valve filter media and the outlet, and wherein expansion of the valve filter media causes the valve filter media to bear against the actuator such that the actuator moves to a second position to close the valve outlet.

8. A valve according to claim 7, wherein the actuator comprises a perforated diaphragm such that water flowing through the valve passes through the diaphragm perforations.

9. A valve, comprising:
 a housing defining a chamber having an inlet and an outlet;
 a valve filter media within the chamber arranged such that liquids flowing between the inlet and the outlet pass through the valve filter media, the valve filter media being arranged to absorb hydrocarbons, causing material properties of the valve filter media to change, thereby restricting the flow of liquids through the valve and increasing the pressure differential across the valve filter media; and
 an actuator having at least a first portion positioned within the housing chamber and normally in a first position allowing flow of liquid through the valve;
 wherein if the pressure differential across the valve filter media exceeds a predetermined threshold, the valve filter media and actuator cooperate to restrict the flow of liquids through the valve, wherein the actuator extends across the chamber between the valve filter media and the outlet, and wherein expansion of the valve filter media causes the valve filter media to bear against the actuator such that the actuator moves to a second position to close the valve outlet, wherein the actuator comprises a perforated diaphragm such that water flowing through the valve passes through the diaphragm perforations, wherein the outlet comprises a hole in the housing and the diaphragm comprises a first uninterrupted portion arranged to contact the housing surrounding the hole when the valve filter media bears against the diaphragm to close the outlet, the diaphragm further comprising a second perforated portion to allow liquids to flow through.

10. A valve, comprising:

a housing defining a chamber having an inlet and an outlet;

valve filter media within the chamber arranged such that liquids flowing between the inlet and the outlet pass through the valve filter media, the valve filter media being a hydrocarbon-absorbing media having changes in material or physical properties when exposed to hydrocarbons, which changes restrict the flow of liquids through the valve and increase the pressure differential across the valve filter media; and an actuator having at least a first portion positioned within the housing chamber between the valve filter media and the outlet, the actuator normally being in a first position when the pressure differential across the valve filter media is below a predetermined threshold allowing the flow of liquids through the outlet of the valve;

wherein when the pressure differential across the valve filter media exceeds a predetermined threshold, the valve filter media and the actuator cooperate to cause the actuator to move to a second position restricting the flow of liquids through the outlet of the valve.

11. A valve according to claim 10, wherein the actuator extends across the chamber between the valve filter media and the outlet, and wherein expansion of the valve filter media causes the valve filter media to bear against the portion of the actuator between the media and outlet such that the actuator moves to close the valve outlet.

12. A valve according to claim 10, wherein the valve filter media has expansion properties when exposed to hydrocarbons, such that expansion of the valve filter media causes the valve filter media to bear against the portion of the actuator between the media and outlet to move the actuator from the first position to the second position.

13. A valve according to claim 10, wherein the actuator comprises a perforated diaphragm such that water flowing through the valve passes through the diaphragm perforations, and wherein the outlet comprises a hole in the housing, and the diaphragm comprises a first uninterrupted portion arranged to contact the housing surrounding the hole when the valve filter media bears against the diaphragm to close the outlet, the diaphragm further comprising a second perforated portion to allow liquids to flow through.

* * * * *